(No Model.)
D. J. MACPHERSON.
ELECTRIC CAR BRAKE.
No. 273,565. Patented Mar. 6, 1883.
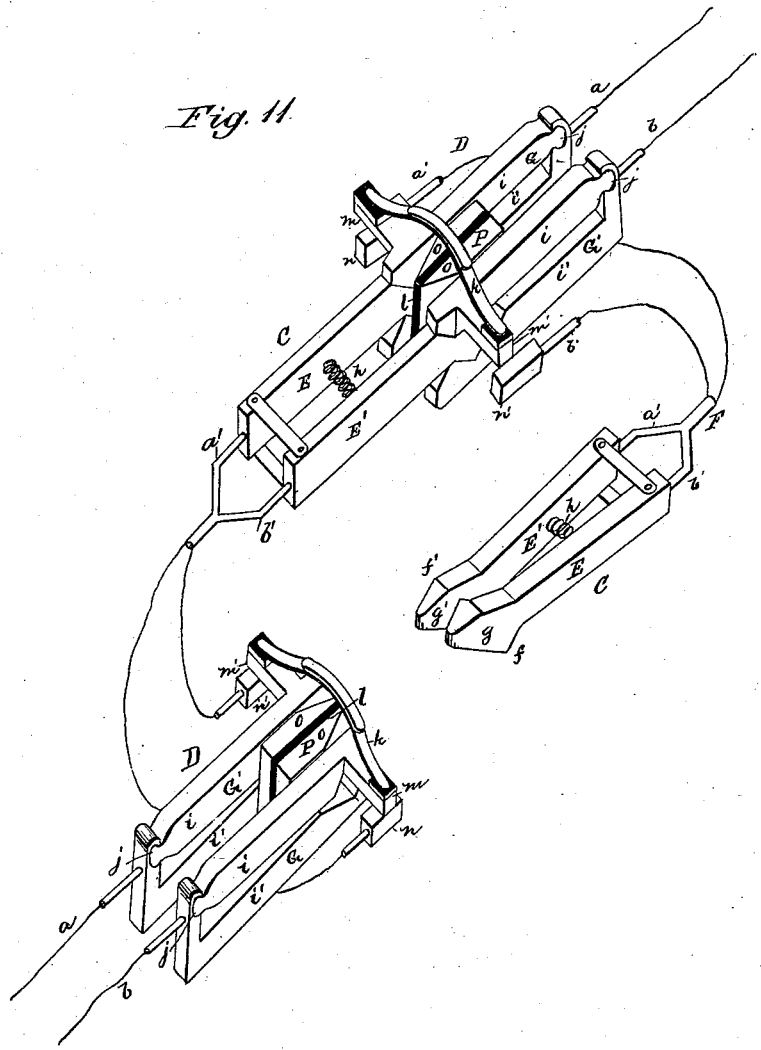
WITNESSES:
INVENTOR:
D. J. Macpherson
BY Munn & Co.
ATTORNEYS.

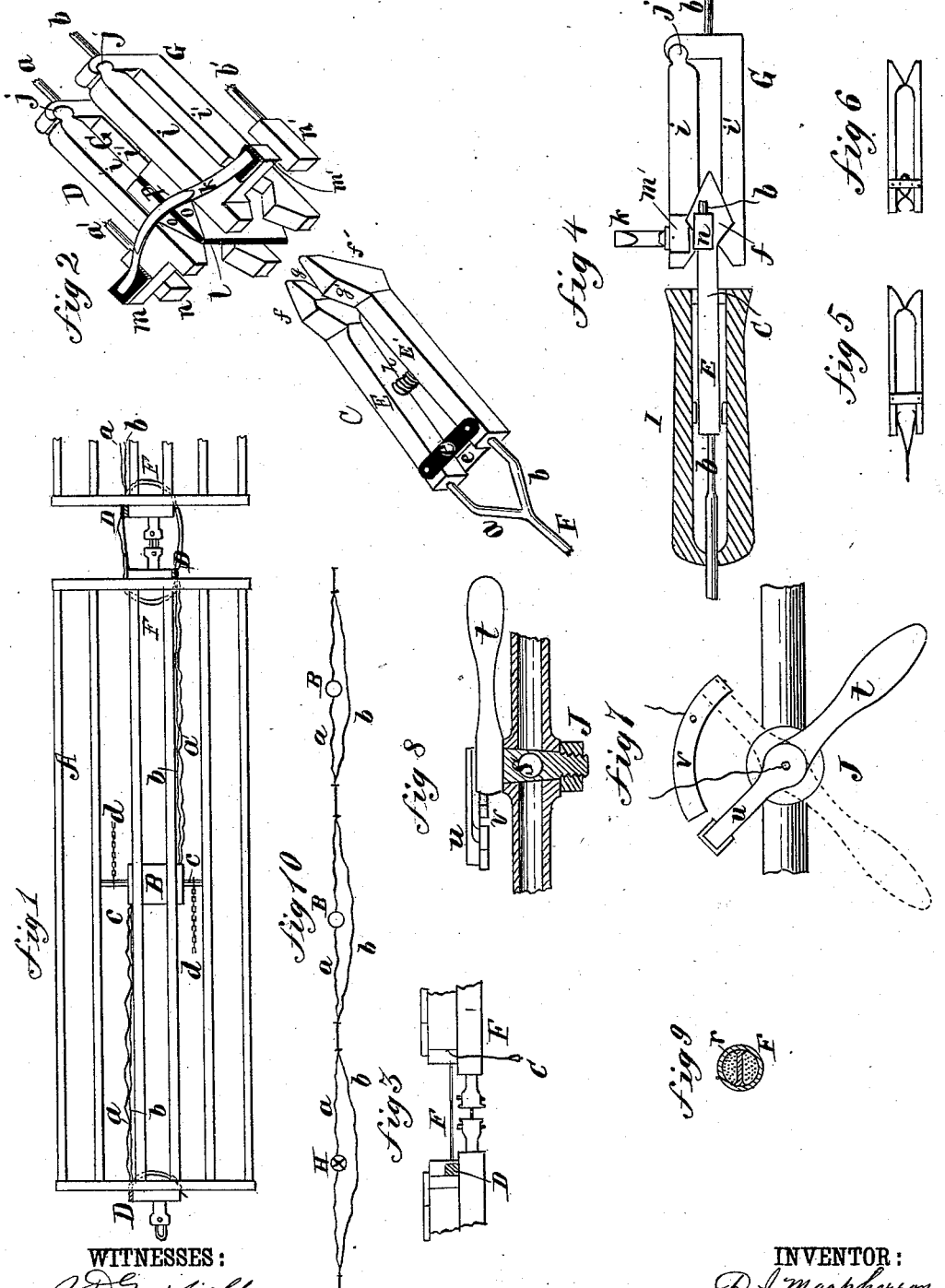

UNITED STATES PATENT OFFICE.

DAVID J. MACPHERSON, OF SIOUX FALLS, DAKOTA TERRITORY.

ELECTRIC CAR-BRAKE.

SPECIFICATION forming part of Letters Patent No. 273,565, dated March 6, 1883.

Application filed August 10, 1882. (No model.)

*To all whom it may concern:*

Be it known that I, DAVID J. MACPHERSON, of Sioux Falls, Minnehaha county, Territory of Dakota, have invented a new and useful Improvement in Electric Car-Brakes, of which the following is a specification.

This invention relates to the class of electric car-brakes in which the brakes are operated by a current of electricity under the control of the engineer; and the invention consists in a magneto or dynamo electric machine placed on the locomotive and driven by steam furnished by the locomotive-boiler, the dynamo being connected by suitable conductors with electric motors under the cars arranged to operate the brakes, the whole being arranged so that by closing the circuit the brakes will be set and by breaking the circuit the brakes will be released.

It also consists in novel uncoupling devices, and in a combined electric switch and steam valve or cock.

In my improved system of electric car-brakes the force with which the car-brakes are applied depends upon the velocity of the generator.

In the accompanying drawings, Figure 1 is a plan view of a car having my improved brake applied. Fig. 2 shows the electric coupling in perspective. Fig. 3 shows the same in side elevation. Fig. 4 shows the same partly in longitudinal section. Figs. 5 and 6 are modified forms of the coupler. Figs. 7 and 8 are respectively plan and sectional views of the combined stop-valve and electric switch. Fig. 9 is a transverse section of an electric conductor; and Fig. 10 is a diagram showing the arrangement of the generator, conductors, couplings, and motors. Fig. 11 is a perspective view of the two set of couplers, showing their relative arrangement, with one set coupled.

In Fig. 1, *a b* are the conducting-wires extending under the car A, and connecting with the electric motor B, located conveniently under the car. This motor is of any ordinary well-known construction, and the shaft *c* receives upon its ends the brake-chains *d*, which are connected with the ordinary brake-levers of the car, so that when the shaft of the electric motor is made to revolve by the passage of the electric current the chains are wound and the brakes are applied.

The wire *a*, in its passage from one end of the car to the other, includes the motor B; but the wire *b* is only a return-wire to complete the circuit through the car in the manner presently to be described. Figs. 2, 3, 4, 5, 6, and 11 show the couplings and their relative arrangement, each of which consists of two parts, C D, the parts C being composed of two metal bars, E E', connected together at the end by insulating-links *e e*. The free ends of the bars E E' are enlarged, forming two diamond-shaped heads, *f f'*, with angular projections *g g'* on their adjacent surfaces. The bars E E' are drawn toward each other by a coil-spring, *h*, placed between them and connected with both. This spring is capable of drawing the free ends of the bars E E' into electrical contact. The pivoted ends of the bars E E' are connected with the two halves of the double conducting-cord F. This double cord extends through the timbers of the car, and connects with the wire *a' b'* of the part D, as hereinafter described.

The fixed portion D of the coupling consists of two parts, G G', each composed of two jaws, *i i'*, hinged together at *j*, and pressed toward each other by the spring *k*, mounted on the double wedge *l*, the latter being attached to the lower jaws, *i'*, of the parts G G'. The ends of the spring *k* bear upon insulators resting on arms *m m'*, projecting horizontally from the outer sides of the jaws *i*. Below the arms *m m'* there are contact-pieces *n n'*, connecting with the wires *a' b'*. The jaws *i i'* are recessed to receive the enlarged ends of the bars E E' of the part C. The wedge *l*, attached to the jaws *i'* of the fixed portion of the coupling, is either made entirely of insulating material or composed of two wedges, *o*, separated by a plate, P, of insulating material, as in the drawings.

The part D of the coupling is placed at one side of the car-coupling, on each end of the car, so that the two parts D will be arranged diagonally opposite in relation to each other on the same car, and the part D of the couplings of adjacent cars will bear the same relation to each other. The receiving part D of the coupling is inclosed in a covering or box, and its wires *a b* are connected with the wires *a b* that extend through the car, while the wires *a' b'* pass around the coupling under the car or its platform, and are connected at the opposite side of the coupling with the double flexible conductor F, connected with the part C of the coupling.

It will thus be seen that each end of each car is provided with one receiving-coupling D and one double flexible conductor, with the coupler C attached to its free end, adapted to enter the part D of the coupling on the adjacent car. If the parts C of one car be connected with the part D of the adjacent car, as shown in Fig. 11, the arms m m' will be raised from the contact pieces n n', and D will be disconnected from C of its own car, and the jaws of C being entirely insulated from each other when inserted in D by its links e and the wedges O of the part D, the current will pass from D to C and from C to the contact-pieces n n' under the arms m m' of the part D of its own car, and the arms m m' being in contact with the contact-pieces n n', the current is conducted through D and the connecting-wires a b to the end of the car, and so on throughout the entire train. Either set of the couplers may be used; but both sets are not to be used at the same time, for, since, when the part C is entered into the part D, the connection between the two parts C D of the couplers of one car is broken, the same result would follow if the other set of couplers be used at the same time, and therefore it would result in leaving the circuit open.

When the cars are separated the parts E E' of the couplers C are drawn together by the spring h, bringing their outer ends into contact, completing the electric circuit at that point. The fixed part D of the coupling completes the circuit through the wires a' b by contact of the arm m with the contact-piece n. In like manner the circuit is complete through a b' by contact of the arm m' with the contact-piece n'.

The locomotive is equipped with conductors and with couplings in the same manner as the cars; but instead of a motor, as in the case of the cars, it has an electric generator, H, Fig. 10.

To couple a car to the engine or to couple one car to another, the coupler C is pushed into the fixed part D of the coupling so that the insulating-wedge l separates the bars E E', and the enlarged ends of the bars E E' raise the jaws i i and lift the arms m m' from the contact-pieces n n'. The circuit is now through the conductors a b, throughout the train, and through the bars E E' and jaws i i'.

For convenience in handling the coupler C, I have placed over it a hollow handle, 1, as shown in Fig. 4, and I have made the double flexible coupling-conductor in semi-cylindrical halves, each composed of a number of wires and all inclosed in a flexible insulating-cover, r.

Between the engine employed in driving the dynamo or magneto machine and the boiler of the locomotive I place the steam-cock J, which is of the ordinary construction. To the plug s or to the lever t of this cock I secure a metallic spring switch-arm, u, which is capable of touching the curved contact-piece v when the lever t is turned in the operation of opening the valve to admit a supply of steam to the engine driving the electric generator. Sufficient steam is always allowed to pass to this engine through a passage (not shown) to keep it in continuous but not rapid motion.

When the lever t is turned to supply the steam-engine with sufficient steam to operate the dynamo, the switch-arm u comes into contact with the curved contact-piece v and remains in contact with it during any further forward motion of the lever t, whereby the circuit is closed and the brakes applied. As before stated, sufficient steam being admitted to the dynamo to keep it in motion when the main supply of steam is cut off, it follows that if the switch-arm were in contact with the contact-piece at all times the circuit would be always closed, and consequently the brakes applied slightly during that time and hence the switch-arm should only be in contact with the contact-piece when it is desired to apply the brakes. By means of this cock the locomotive engineer may control the brakes perfectly, their power depending upon the velocity of the dynamo. The couplings complete the electric circuits of the respective cars automatically when the cars are separated, so that the apparatus requires no attention after coupling.

In Figs. 5 and 6 I have shown two forms of curved spring that may be used in place of the spring h in the parts C of the coupling.

Having thus described my invention, I claim as new and desire to secure by Letters Patent—

1. A double electrical conductor composed of two semi-cylindrical halves, each composed of a number of strands insulated from each other and inclosed in an insulating-casing, as herein specified.

2. The pivoted bars E E', having enlarged ends f f', and the spring h, in combination with the jaws i i', spring k, and wedge l, as specified.

3. In an electric coupling, the combination of the jaws i i', spring k, arms m m', and contact-pieces n n', as herein specified.

4. In an electrical car-brake, the combination, with the electrical generator and steam-pipe leading thereto from the locomotive-boiler, of the cock adapted to admit a small quantity of steam to the said generator when the main supply is cut off, the lever t, provided with the switch-arm u, and the contact-piece v, substantially as and for the purpose set forth.

5. In a system of electric car-brakes, the combination of the conductors a b a' b', coupling C D, and double flexible conductor F, as specified.

6. In a system of electric brakes, one or more motors, B, the conductors a b a' b', contact-pieces m m' n n', electric couplings C D, and an electric generator, as herein specified.

DAVID J. MACPHERSON.

Witnesses:
THOMPSON RITCHIE,
O. D. BROWN.